United States Patent Office 3,759,879
Patented Sept. 18, 1973

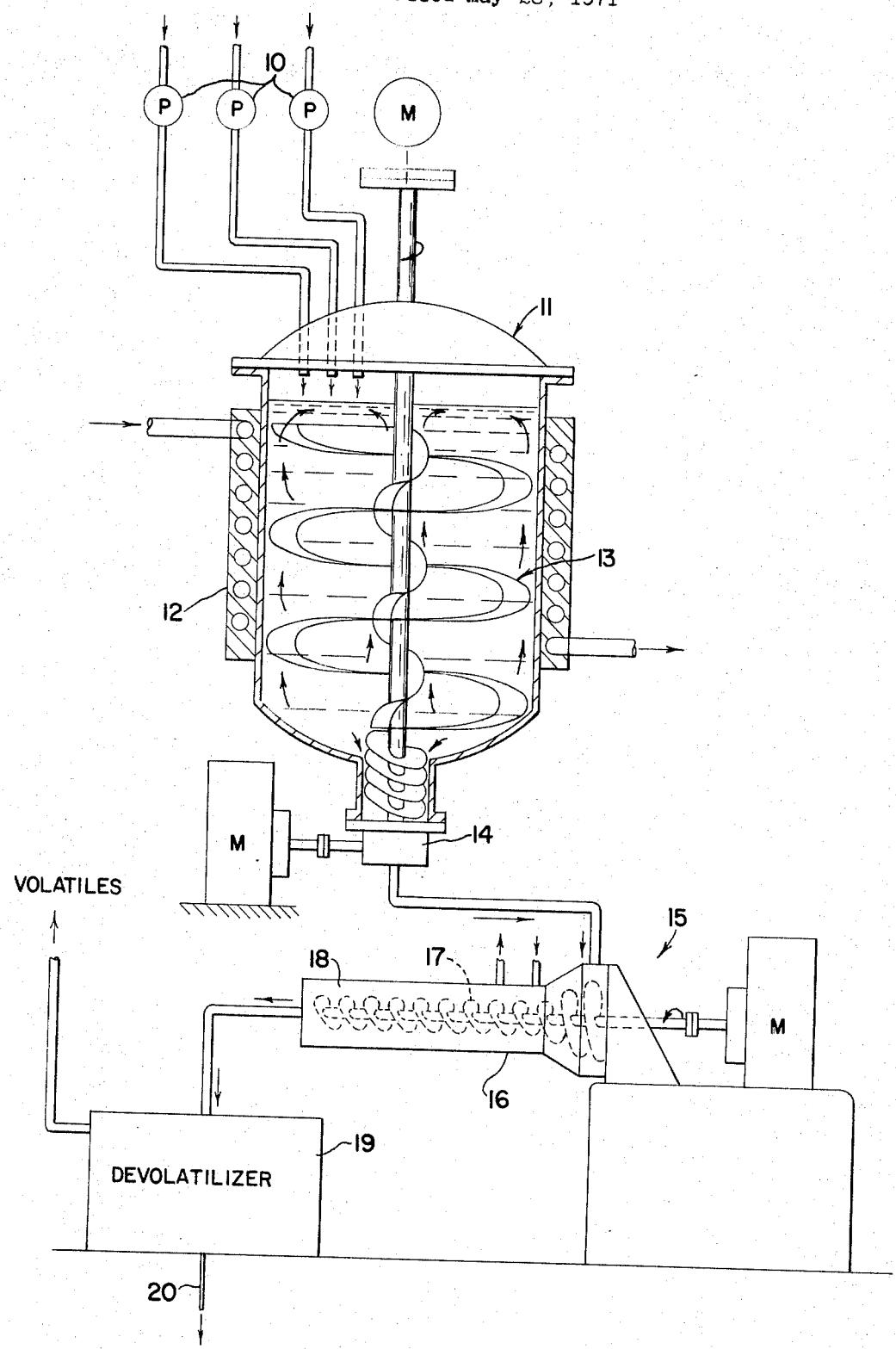

3,759,879
CONTINUOUS BULK POLYMERIZATION PROCESS FOR VINYL CHLORIDE COPOLYMERS
John C. Floros, Lunenburg, Mass., assignor to The Firestone Tire & Rubber Company, Akron, Ohio
Filed May 28, 1971, Ser. No. 147,907
Int. Cl. C08f 1/06
U.S. Cl. 260—78.5 CL         8 Claims

ABSTRACT OF THE DISCLOSURE

A continuous, homogeneous bulk polymerization process for producing copolymers, terpolymers, and tetrapolymers of vinyl chloride and lower alkyl esters of maleic or fumaric acids, which polymers contain a minimum amount of residual unreacted monomer, in a specific temperature-time cycle in at least two reaction zones in the presence of known catalysts and modifiers under substantially anhydrous conditions. The polymer formed must be soluble in the monomer at all times throughout the polymerization reaction.

BACKGROUND OF THE INVENTION

The instant invention is a continuous bulk polymerization process for the manufacture of specific vinyl chloride copolymers, for "lacquer" applications where the resin is applied from solution to coat metallic objects. It is a continuous bulk polymerization process. Polymerization in bulk or mass consists in heating or otherwise converting monomers or other intermediates, usually with small concentrations of catalysts or other accelerators, but without solvents or other dispersing media. (Polymer Processes by C. E. Schildknecht, Interscience Publishers, Inc., New York, page 31.)

In bulk polymerization of liquid monomers, the unreacted monomer is the medium in which the polymerization takes place to give at first a viscous solution (if the polymer formed is soluble in the monomer), or a precipitate of polymer, more or less swollen by the monomer (if the polymer is insoluble in the monomer). Toward the end of the polymerization, the polymer must be regarded as a medium in which the reaction is completed, relatively slowly because of the low concentration of remaining monomer. The extent to which monomer has been converted to polymer is called the "conversion," i.e., the percent polymer which can be isolated at that stage. By common usage, "degree of polymerization" means the average number of monomer units per polymer molecule, a measure of molecular weight. In large scale industrial operations, the polymerizations of vinyl type monomers must be meticulously devised to overcome formidable difficulties inherent in the character of the free-radical-chain reaction. Most polymerization reaction, once initiated, liberate such considerable quantities of heat that the mass early becomes so viscous that the rate of heat transfer between even relatively close portions of the mass is very poor. In consequence, when a large body of monomer is polymerized, difficulty is experienced in removing the heat uniformly as fast as it is liberated; thus extreme local overheating usually occurs. In the overheated areas, reaction proceeds too rapidly, forming polymers of low molecular weight, which appear as inhomogeneities in the final product. In addition, in autocatalytic polymerization it is not uncommon for such local overheating to spread rapidly, causing a general rise in temperature, which may reach such proportions as to render the entire contents of the vessel discolored and unusable, or even to result in an explosion. For these reasons, mass bulk polymerization in large vessels as heretofore carried out has rarely been an acceptable commercial process. These difficulties are compounded exponentially when the bulk polymerization reactions are attempted to be carried out continuously.

When a linear polymer is insoluble in its monomer, bulk polymerization gives first a turbidity, then a precipitate of polymer, and then an opaque slurry or agglomerated mass. This is a characteristic of heterogeneous bulk polymerizations, such as occur normally with monomers such as vinyl chloride, vinyl bromide, vinyl fluoride, vinylidene chloride, acrylonitrile, vinylidene chlorofluoride, and the like. It is known that homopolymerization to give clear castings of the above polymers is impossible. Most of the monomers give high softening polymers soluble in few solvents and polymerized with great vigor in bulk. The reactions are difficult to control, especially in the latter stages when a stiff polymer-monomer slurry makes agitation and temperature control impossible. Suspension and emulsion processes are therefore favored industrially. So-called precipitation polymerization from a solvent which dissolves the monomer but not the polymer is generally more practical than heterogeneous bulk polymerization. The instant invention provides a method for obviating the heterogeneous bulk polymerization reaction and forming a bulk copolymer of vinyl chloride which is not precipitated from the reaction mass.

Those skilled in the art of large-scale polymerization will recognize that bulk polymerization of vinyl monomers will usually entail specially designed reactors in which there is essentially no vertical mixing, as for example in the falling-film and thin-film reactors used in the bulk polymerization of styrene copolymers. Surprisingly, the instant process requires homogeneous mixing in the sense that there is no intentional partiality of physical mixing vectors to any specific portion of the contents of the first reactor. The second reactor may be a screw pump, optionally with a "holding zone" in close communication with the discharge of the screw pump. The net effect of the process conditions impressed upon the reaction mass in the two reaction zones permits continuous bulk copolymerization.

SUMMARY OF THE INVENTION

It has been discovered that in a process for the copolymerization of a major quantity of vinyl chloride with a minor quantity of lower alkyl maleate or the lower alkyl half-ester of maleic acid, or the corresponding lower alkyl esters of a fumaric acid, the polymerization may be effected continuously if it is carried out in at least two distinct reaction zones, under substantially anhydrous conditions and under narrowly defined process conditions. It is critical that the instant lower alkyl ester be a comonomer if the reaction is to be carried out without precipitation of the polymer.

THE DRAWING

The drawing is a schematic process flow of the instant process.

PREFERRED EMBODIMENT OF THE INVENTION

A preferred process is the continuous bulk polymerization of from about 70 to about 82 parts of monomeric vinyl chloride and from about 18 to about 30 parts of dibutyl maleate, dibutyl fumarate and the butyl half-ester of maleic or fumaric acids. Other lower alkyl esters of the dicarboxylic acids are also successful in forming a copolymer which does not precipitate from the reaction mass; in these esters the alkyl group has from about 1 to about 6 carbon atoms.

The lower alkyl esters of maleic or fumaric acid may be increased to about 50 parts per 100 parts monomer, without substantially affecting the residual monomer content or the amount of peroxy catalyst required. The action of the esters or half-esters is explainable, in that they apparently plasticize and solubilize the polymer, thus keeping it "in solution," tempering the bulk polymer reaction, but the range of relative viscosity of polymer produced is relatively well-confined in the range from about 1.25 to about 1.55, as measured by efflux time of a 1% solution in cyclohexanone compared to the pure solvent. It will be recognized that the term "in solution" is used loosely, in a physical sense, to describe the reaction mass in which the polymer is prevented from precipitating, and not in the technical sense of a solution polymerization reaction, which this is not. Again, the use of the alkyl esters permits superior adhesion of the polymer when it is dissolved in a solvent to be used as a lacquer coating for metal articles.

Sufficient vertical, horizontal, and rotational agitation is provided in the first reaction zone to maintain the viscosity of the polymer, leaving the first stage in the range from about 100,000 cps. to about 500,000 cps., and no more than 75 percent of the vinyl chloride monomer is present as unreacted vinyl chloride in the effluent from the first stage. The temperature in this first reaction zone is maintained in the range from about 80° to 175° F., and, more preferably, in the range from about 110° to 150° F. The pressure at which the reaction is carried out in the first reaction zone is the vapor pressure of vinyl chloride at the reaction temperature. Generally the prepolymer effluent from the first reactive zone has a solids content in the range of from about 25% to 55%. Optionally, an inert gas may be used for additional pressure to provide the necessary hydraulic head to transport polymer from the first reaction zone into the second reaction zone. Vapors of vinyl chloride during the reaction in the first reaction zone may be removed from the reactor, condensed and returned, particularly as a means for controlling the temperature in the reactor. The reactor is preferably a jacketed cylindrical reactor in which a heat exchange fluid at any desired temperature may be pumped to control the reaction in the reactor. Preferred conversion in the first reaction zone is in the range from about 50 percent to 60 percent. A preferred agitator in the first reaction zone is a ribbon agitator on a central shaft.

The effluent from the first reaction zone is pumped by a gear pump into a second reaction zone at a temperature in the range from about 140° to 270° F., equipped with means for homogeneously mixing a relatively high viscosity fluid mass having a viscosity in the range from about 500,000 cps. to about 1.5MM cps. at a process temperature. A preferred end reaction zone is provided by a screw-type reactor in which polymerization may be carried to about 90 percent completion. It is preferred to take the output from the screw-type reactor into a devolatilizer to remove such unreacted monomers as there may be present and to extrude the devolatilized polymer into a quench bath. Once equilibrium has been maintained, the process is continuous and requires only that the necessary feed materials, including suitable known free radical catalyts, such as lauroyl peroxide, benzoyl peroxide and other diacyl peroxides, alkyl peroxy dicarbonates, alkyl peroxy pivalates, and organic azo compounds such as azo-bis iso butyro nitrile, be proportioned into the first reaction zone.

It is particularly noteworthy that the instant continuous copolymerization will proceed smoothly with controllable viscosity and molecular weight in the presence of other esters, for example, vinyl acetate or alkyl acrylates, so long as enough of the lower alkyl esters of maleic and fumaric acid are present (for example, 30 parts) to solubilize the polymer which is being formed. Specifically, vinyl acetate and alkyl acrylates may be used as partial replacements for the vinyl chloride, to the extent of about 20 parts per 100 parts of reactants, or as a partial replacement for the lower alkyl esters of maleic and fumaric acid to the extent of less than about 8 parts per 100 parts of reactants.

Referring now to the appended figure for a detailed description of the process, predetermined quantities of reactants are proportioned through feed pumps, denoted generally as 10, into a first reaction zone, which is a prepolymerizer reactor, denoted generally as 11. Once the reaction is under way, the reactants are introduced on top of, or within the body of, liquid monomer and partial polymer contained in this first reaction zone at a rate to keep the vessel full of liquid, or to maintain a constant liquid level therein. The space above the liquid in the first reaction zone should be free from air and oxygen, but may be filled with monomeric vinyl chloride vapor or with an inert gas such as nitrogen, methane, carbon dioxide, or the like. Preferably, however, the first reaction zone 11 is kept relatively full of liquid and under the partial pressure exerted by vinyl chloride vapor, except for modifiers such as trichloroethylene, carbon tetrachloride, ethylene dichloride, isobutylene, etc. and such trifing amounts of other gases as may be dissolved in the incoming monomers, catalysts, modifiers, and the like. When the modifier is isobutylene, the vapor pressure at reaction temperature is pronounced but has no deleterious effect on the reaction.

The first reaction vessel, referred to hereinbefore as the prepolymerizer reactor, is operated with a constant liquid level under positive pressure, which incidentally prevents contamination of the monomer and resulting polymer with lubricant or other material which might be extracted from the stuffing glands located above the reactor. The polymerization temperature of the liquid is kept constant in the reactor by withdrawing heat from, or supplying it to, the reaction mass through the walls of the reactor by means of the heat transfer fluid circulating within a jacket 12 around the reactor. Additionally, vapors may be removed from the reactor, condensed, and returned to the reactor as a means of controlling temperature. It is essential that the reaction mass be provided with sufficient liquid mixing so that the heat transfer problem is always under control.

The polymerization process proceeds uniformly once good agitation is provided early in the reaction, and good blending is maintained at the high viscosity range to permit the necessary heat transfer for control of the exothermic reaction. A preferred agitator in the large reactor is a double spiral impeller 13 which is not only capable of providing mixing for adequate heat transfer, but also keeps the polymer from building up on the walls of the vessel with a minimum expenditure of mixing energy. This double spiral impeller 13 is so designed as to cut through the liquid at a relatively low rate of rotation (about 60 r.p.m.) to effect temperature equalization within the reactor by causing vertical, horizontal, and rotational mixing of the reaction mass from the upper levels with that from the lower levels of the reactor. The rate of feed of vinyl chloride to the first reaction zone 11 is adjusted to effect a fixed amount of polymerization between about 20 and 60 percent of that which is theoretically possible. The viscosity of the effluent is in the range from about 100,000 cps. to about 500,000 cps., and the relative viscosity of the prepolymer is in the range of 1.25 to about 1.55, measured by efflux time of a 1 percent solution in cyclohexanone compared to the pure solvent.

Upon leaving the first reaction zone 11 under applied pressure of the vapor in the reactor, and preferably with the aid of a gear pump 14, the effluent may be constantly monitored for viscosity and uniformity by passing through a continuous recording viscosimeter and any other instrumentation which might be desired to change the reaction conditions in the reactor 11, if necessary, to maintain the viscosity and molecular weight in the correct range. Thus, a decrease in viscosity of polymer is corrected by increasing the temperature, which in turn is done by decreasing the flow of cooling water to the jacket 12. Because of the large mass of material within the reactor relative to that continuously withdrawn, the required temperature adjustment is usually small, and once equilibrium conditions are reached, the changes required are minimal. Alternately, a decrease in viscosity is corrected by decreasing the rate of flow of ingredients to the first reaction zone and proportionately decreasing the rate of transfer to the second reaction zone such that the level in the first zone remains constant.

The effluent from the first reactor 11 is transferred, preferably by a gear pump 14, to a second reaction zone 15, where its temperature is increased almost immediately to within the range from about 140° to 270° F. The polymerizing mass, still liquid, is forwarded through the second reaction zone by the constant introduction of additional partial polymer made possible by the corresponding discharge of polymeric product. The second reaction zone is preferably a screw-type reactor with a cylindrical barrel 16 in which a screw 17, of constant pitch and of such size that there is slight clearance of the order of $\frac{1}{64}$ to $\frac{1}{4}$ inch between the land of each flight and the adjacent cylindrical barrel to effect a wiped surface, constantly turns at controllable speed. The rotational speed of the screw 17 is relatively slow and serves primarily as a local homogenizer for the partial polymer from the first reaction zone, bringing the latter frequently into heat-exchange contact with the jacketed cylindrical barrel 16, and maintaining the mass in each portion of the screw-type reaction at about the temperature of the fluid in the jacket. Alternately, the screw may be provided with an internal core for circulating heat transfer fluid for maintaining the temperature in the reaction zone at 140° F. to 270° F. Pressure is maintained on the polymer by the forwarding effect of the screw 17 against a restriction in the effluent line from the second reaction zone. Preferably, an accumulator 18 is proximately disposed on the end of the screw-type reactor and provides a holding zone for the effluent therefrom.

The accumulator 18 is jacketed with provisions for heat transfer fluid to be pumped through the jacket, which control of temperature permits further control of the degree of conversion of the polymer product. A bleed from the accumulator 18 permits detection, and recording and controlling of the viscosity, by variation of residence time in the previous zone or by corresponding changes in the temperatures of the jacket of the accumulator, as well as in the jacket of the screw-type reactor. From the accumulator 18, the polymer is continuously discharged to a suitable recovery vessel. This polymeric product may have a conversion of up to 95 percent, the remaining being unreacted monomers. For some applications, it may not be necessary to devolatilize the polymeric product and it may be sold as such.

Usually, however, it will be found necessary to discharge the polymer from the accumulator 18 into a suitable devolatilizer 19, where the already low volatiles content is removed by evaporation thereof, by any known means, such as the flashing of thin falling streams of hot polymer under reduced pressure. After such a treatment, the polymer from the devolatilizer may be extruded or pumped from the devolatilizer through a vacuum-type extruder and discharged for cooling below the solidus point, commonly as a thin strip 20, into water or other inert fluid, after which it is cut into particles of a suitable size for sale. The following examples illustrate the invention.

EXAMPLE I

Continuus two-stage process

A solution of 16 parts dibutyl fumarate, 4 parts of the butyl half-ester of maleic acid, and 3 parts of trichloroethylene modifier, mixed with 0.35 parts benzoyl peroxide, is prepared and charged to the first stage reactor equipped with a double spiral impeller, coaxial with the polymerization reactor 11. Optionally, about the lower end of the central hollow shaft a helical impeller may be used to displace viscous partial copolymer from the sump through the outer pipe which leads to the second stage screw-type reactor. The first stage reactor is purged with vinyl chloride vapor and charged with 80 parts of monomeric liquid vinyl chloride. The reaction temperature is set at 135° F. and the batch is allowed to react until the solids reach about 45 percent (and preferably no more than 55 percent) by weight.

The polymer, which has a viscosity in the range from about 200,000 to about 300,000 cps., is continuously transferred by the gear pump 14 to the screw-type second stage reactor with the integral accumulator, where final conversion takes place. The residence time in the screw-type reactor is at least about one minute. Longer residence times are preferred, the precise residence time being a function of the particular polymer recipe, the process conditions, and the equipment used. The polymer is then stripped, quenched, and chipped. Fresh vinyl chloride monomer, along with the other ingredients in the proportions specified, are continuously charged to the first stage at the same transfer rate as the rate of withdrawal of effluent from the first stage of the reactor to maintain the contents of the first reaction zone essentially constant. The clear polymer formed is soluble in methylethyl ketone and acetone.

EXAMPLE II

The same procedure as used in Example I hereinabove is used, except that the following changes in formulation are made: 24 parts dibutyl fumarate, 6 parts butyl half-ester of maleic acid, 3 parts trichloroethylene, 0.5 parts benzoyl peroxide, and 70 parts monomeric vinyl chloride. A clear polymer is formed which is soluble in methylethyl ketone and actone.

EXAMPLE III

The same procedure as used in Example I hereinabove is used, with these changes in formulation: 20.0 parts dibutyl fumarate, 5.0 parts hydrogen butyl maleate, 3.0 parts trichloroethylene, 0.60 part benzoyl peroxide, and 75.0 parts vinyl chloride. A clear polymer is continuously formed which is soluble in methylethyl ketone and acetone.

EXAMPLE IV

Continuous three-stage process using an additional intermediate reactor

A solution is prepared of 5.0 parts trichloroethylene, 16.0 part dibutyl maleate, 40 parts hydrogen butyl maleate, 0.1 part lauroyl peroxide, and 0.34 part benzoyl peroxide. 25.44 parts of this solution is charged to the first stage reactor. The first stage is then purged three times with vinyl chloride, followed by a charge of 80.0 parts vinyl chloride. The reaction temperature is set at 124° F. Before th first stage solids content reaches 35 percent by weight, the second stage is charged, using both the above procedures and recipe, to one-half its capacity. When the solids in the first stage reach 35 percent by weight, the contents of the first stage are metered to the second stage. At the same transfer rate, unreacted vinyl chloride and the above solution are added to the first stage to maintain the reaction. After the desired amount of the first stage is transferred, the transfer is stopped and the reaction temperature of the second stage is set in the range from 117° F. to 128° F. The first stage is simultaneously cooled to slow its conversion rate. Then, when the solids in the second stage reach 60 to 70 percent, the contents of the second-stage reactor are metered to a screw-type, third-stage reactor, where the conversion is completed.

The unit thereby becomes continuous, feeding unreacted vinyl chloride and solution to the first stage and removing completely reacted product from the screw-type, third-stage reactor. The feed rates are maintained so as to keep a constant product rate and constant levels in the first and second stages. The polymer from the third-stage reactor is clear and soluble in methylethyl ketone and acetone.

I claim:

1. A continuous homogeneous bulk polymerization process in at least two distinct reaction zones for producing a copolymer of vinyl chloride and a lower alkyl ester of maleic or fumaric acids in the presence of a known free radical catalyst under substantially anhydrous conditions, wherein said copolymer contains a minor quantity of residual unreacted monomer, comprising controlling the continuous prepolymerization in a first reaction zone at a temperature in the range from about 80° to about 150° F. under vapor pressure of vinyl chloride monomer at the reaction temperature so that no more than 75 percent of vinyl chloride monomer is left unreacted in the effluent from said first reaction zone, said effluent having a viscosity in the range from about 100,000 cps. to 500,000 cps., controlling progressive polymerization of the prepolymer in a second reaction zone at a temperature in the range from about 150° to about 270° F. while advancing the polymerizing material against sufficient back pressure to insure a residence time of at least about one minute so as to form a copolymer substantially soluble in the monomer at all times during the polymerization reaction, with a degree of conversion in the range from about 75 percent to 95 percent and residual volatile matter less than 20 percent, and recovering the copolymer product from said second reaction zone, the rate of withdrawal of the copolymer product from said first reaction zone being balanced by the rate of introduction of vinyl chloride, ester and catalyst into said first reaction zone.

2. The process of claim 1, wherein said vinyl chloride is present in the range from about 65 percent to 85 percent by weight and said lower alkyl ester of fumaric or maleic acids is present in the range from about 12 percent to 30 percent by weight of the reaction mass.

3. A continuous homogeneous bulk polymerization process which comprises continuously adding monomeric vinyl chloride and monomeric lower alkyl ester of a dicarboxylic acid selected from maleic and fumaric acids in the presence of a known free radical catalyst under substantially anhydrous conditions at constant rates to a vinyl chloride/lower alkyl maleate or fumarate reaction mass maintained at a temperature in the range from about 80° to 175° F. and the vapor pressure of vinyl chloride at the reaction temperature under conditions to ensure essentially homogeneous mixing and blending of the reaction mass, continuously withdrawing partially copolymerized vinyl chloride/lower alkyl maleate or fumarate material from the bottom of said reaction mass at the same constant rate which is so chosen that, at the prevailing temperature and pressure, the copolymer has polymerized to a value between 20 percent and 60 percent of the extent theoretically possible and has a viscosity in the range from about 100,000 cps. to 500,000 cps. and a relative viscosity in the range from about 1.25 to 1.55 as measured by efflux time of a 1 percent solution in cyclohexanone compared to the pure solvent, continuously introducing the so-withdrawn copolymer into an elongated cylindrical polymerization zone, continuously mixing the polymerizing material in the zone with other such material therein while advancing the polymerizing material through the cylindrical zone in a temperature range from about 140° to 270° F. to maintain a polymer with a viscosity in the range from about 500,000 cps. to 1,500,000 cps. said polymer being substantially soluble in said monomer at all times during the polymerization reaction, continuously withdrawing the copolymer which has been converted to a value between 60 percent and 95 percent of the extent theoretically possible, devolatilizing the copolymer while still fluid in an inert atmosphere under reduced pressure to remove substantially all of the remaining volatile matter from the copolymer, and continuously discharging the devolatilized copolymer from the devolatilization zone into a cooling zone for recovery of the solid polymer.

4. The process of claim 3 wherein said vinyl chloride is present in the range from about 65 percent to 85 percent by weight and said lower alkyl ester of fumaric or maleic acids is present in the range from about 12 percent to 30 percent by weight of the reaction mass.

5. A two-stage continuous homogeneous bulk polymerization process for continuously preparing a vinyl chloride polymer composition capable of being dissolved in a solvent for a lacquer application adherent to a metal surface which comprises forming said polymer, which is soluble in monomer at all times during the two-stage reaction, by continuously proportioning the following ingredients under substantially anhydrous condition to form a mixture composed essentially of from about 65 percent to 85 percent by weight of vinyl chloride, from about 12 percent to 30 percent by weight of lower alkyl ester of maleic or fumaric acids, and sufficient free radical catalyst and modifiers to initiate and prepolymerize the reaction mixture in a first reaction zone maintained at a temperature in the range of from 80 to 175° F. and a vapor pressure of vinyl chloride at the reaction temperature to an extent such that the effluent therefrom has a solids content in the range from about 25 percent to 55 percent and a viscosity in the range of about 100,000 cps. to 500,000 cps., and thereafter conducting said effluent to a second reaction zone and controlling the progressive polymerization of the prepolymerization therein at a temperature from about 150° to 270° F. while advancing the polymerizing materials against sufficient back pressure to ensure a degree of conversion in the range from about 75 percent to 95 percent of the extent theoretically possible and residual volatile material less than 10 percent thereafter recovering the copolymer product from said second reaction zone, the rate of withdrawal of the copolymer product from said first reaction zone being balanced by the rate of introduction of vinyl chloride, ester and catalyst into said first reaction zone.

6. The process of claim 5 wherein said second reaction zone includes a holding zone integrally combined with and proximately disposed to said second reaction zone.

7. The process of claim 6 including in addition conducting the effluent from said said second reaction zone to a devolatilizer wherein substantially all volatile are removed.

8. The process of claim 7 including in addition conducting the material from said devolatilizer into an extruder and thereafter quenching the product to a point below its solidus point.

References Cited

UNITED STATES PATENTS

| | | | |
|---|---|---|---|
| 2,769,804 | 11/1956 | Hanson | 260—86.7 |
| 3,268,625 | 8/1966 | Jones et al. | 260—880 |
| 3,513,145 | 5/1970 | Crawford | 260—93.5 |
| 3,538,062 | 11/1970 | Thomas et al. | 260—78.5 |

FOREIGN PATENTS

| | | | |
|---|---|---|---|
| 467,383 | 8/1950 | Canada | 260—78.5 |

JOSEPH L. SCHOFER, Primary Examiner

J. KIGHT, III, Assistant Examiner

U.S. Cl. X.R.

260—95 C

PO-1050
(5/69)

UNITED STATES PATENT OFFICE
CERTIFICATE OF CORRECTION

Patent No. 3,759,879      Dated September 18, 1973

Inventor(s) John C. Floros

It is certified that error appears in the above-identified patent and that said Letters Patent are hereby corrected as shown below:

In Column 1, Line 55, "reaction" should read --reactions--.

In Column 5, Line 30, "reaction" should read --reactor--.

In Column 5, Line 46, "zone" should read --zones--.

In Column 6, Line 51, "part" should read --parts--.

In Column 6, Line 51, "40 parts" should read --4.0 parts--.

In Column 6, Line 57, "th" should read --the--.

In Column 8, Line 19, "condition" should read --conditions--.

In Column 8, Line 39, "percent thereafter" should read --percent, thereafter--.

In Column 8, Line 49, "said" is repeated.

In Column 8, Line 50, "volatile" should read --volatiles--.

Signed and sealed this 17th day of December 1974.

(SEAL)
Attest:

McCOY M. GIBSON JR.
Attesting Officer

C. MARSHALL DANN
Commissioner of Patents